United States Patent [19]

Schlingman

[11] Patent Number: 5,443,778
[45] Date of Patent: Aug. 22, 1995

[54] VENT APPARATUS AND METHOD FOR THERMOSET INJECTION MOULDING SYSTEMS

[75] Inventor: Robert M. Schlingman, Mount Vernon, Wash.

[73] Assignee: Tempress Incorporated, Seattle, Wash.

[21] Appl. No.: 173,609

[22] Filed: Dec. 23, 1993

[51] Int. Cl.$^6$ .................. B29C 45/14; B29C 45/34
[52] U.S. Cl. ...................... 264/257; 264/328.1; 264/328.2; 264/328.12; 425/129.1; 425/546; 425/812
[58] Field of Search .............. 264/328.1, 102, 257, 264/258, 328.6, 328.12, 328.2; 425/546, 129.1, 812

[56] References Cited

U.S. PATENT DOCUMENTS

| 3,822,857 | 7/1974 | Tanie | 249/141 |
| 4,740,145 | 4/1988 | Shurman | 425/812 |
| 4,876,050 | 10/1989 | Horton | 264/258 |

OTHER PUBLICATIONS

Eckler et al., "Development of Flow Models for SRIM Process Design," ASM, IEDS Adv. Compos. Conf. (1987).
Slocum et al., "Material and Process Effects on the Cost of Structural RIM," *SAE Technical Paper Series International Congress and Exposition* SAE No. 890199 pp. 33-41 (Feb. 27-Mar. 3, 1989).
Chan et al., "Modeling Nonisothermal Impregnation of Fibrous Media With Reactive Polymer Resin," *Polymer Engineering and Science* vol. 325 pp. 310-318 (Mid-Mar. 1992).

*Primary Examiner*—Jill J. Heitbrink
*Attorney, Agent, or Firm*—Christensen, O'Connor, Johnson & Kindness

[57] ABSTRACT

A method for reducing the occurrence of voids and areas of porosity in injection molded parts. Vents are placed within the injection mold near areas of the molded part that are prone to the occurrence of voids and areas of porosity. A porous flow regulator is placed adjacent the vents to regulate the flow of the resin near the vent. The flow regulator allows air trapped within the mold to escape through the vents during molding. Allowing air trapped within the mold to escape reduces the occurrence of voids and areas of porosity in the molded part. A porous plug extends through the flow regulator and into the vent. The porous plug prevents excess quantities of resin from flowing out of the vent, thus reducing waste and also helping to maintain the flow regulator in place.

22 Claims, 2 Drawing Sheets

VENT APPARATUS AND METHOD FOR THERMOSET INJECTION MOULDING SYSTEMS

FIELD OF THE INVENTION

The present invention relates to venting methods and apparatus for use in thermoset injection molding systems and, more particularly, to the controlling of the flow of the injected resin in order to reduce voids within the molded part.

BACKGROUND OF THE INVENTION

Thermoset injection molding systems such as reaction injection molding (RIM), structural reaction injection molding (SRIM), resin transfer molding (RTM), etc., are used widely throughout industry to form parts of varying shapes and complexity. In thermoset injection molding, a thermosetting material such as a polyester or epoxy resin is injected into a mold having an interior cavity that defines the shape of the formed part. Sufficient resin is injected into the mold to allow the resin to completely fill the interior cavity of the mold and to force air within the mold out. It is important that the injection mold and the injection operation be carefully designed, monitored and controlled to ensure that all the air is driven out of the mold; otherwise, air may become trapped within the mold cavity. Air trapped within the mold causes areas of porosity and voids in the molded part. Often, these areas of porosity affect the structural integrity or aesthetics of the part, causing the part to be rejected as commercially unacceptable.

The strength, stiffness, and other structural characteristics of thermoset injection molded parts are determined by the structural design of the part, the type of resin used, and the type of internal reinforcement used. Modern resin systems and reinforcements are used to produce injection molded parts in a wide variety of different industries, including the automobile, truck and airline industries. Often, injection molded parts used in the automobile and airline industries are highly reinforced, either by structural reinforcements such as webs or beads, or through the use of fibrous reinforcements integrally molded into the parts. As structural reinforcements or internal fibrous reinforcements are added to an injection molded part, the part becomes more difficult to fabricate and is more prone to the formation of voids or areas of porosity.

In RIM and RTM systems, a multicomponent thermosetting polymer resin system such as a polyurethane resin material system is generally used. A typical polyurethane resin system consists of two components, one being a blend of polyols or blends of polyols containing catalysts and surfactants and a second component being an isocyanate or isocyanate blend. The multicomponent polyurethane resin system is generally mixed upon injection into the mold via a high-pressure impingement mixing system. The high pressure impingement mixing system is generally placed immediately adjacent the injection port on the mold because upon mixing, the polyurethane resin begins to chemically react. As the resin reacts, it expands dramatically, often increasing in volume by up to 30 times in an unrestricted environment.

In RIM and RTM systems, the mold is generally maintained at room temperature or a slightly elevated temperature, and the resin is injected at a relatively low pressure. A typical mold temperature used in RIM systems is 30° to 90° C. The expansion of the polyurethane resin during the chemical reaction provides the majority of the force necessary to fill the interior cavity of the mold. The magnitude of the pressure produced in the mold by the expanding resin is dependent upon the resin system used, the type and density of reinforcements used, and the amount of blowing agent used. Blowing agents determine the amount of foaming, i.e., expansion, of a polyurethane resin system during the chemical reaction process.

In some RIM systems, the expanding polyurethane resin system placing approximately a 10 to 50 psi force against the interior mold surfaces. This expansion force is generally sufficient to ensure that the expanding resin system fills the interior cavity of the mold.

The time to fabricate a part using RIM systems differs depending upon the resin used, the injection rate, the part size and the part geometry. Once injected, a typical resin system used in RIM will cure within 30 seconds to several minutes. The completed part may then be immediately removed from the mold.

The density of a completed RIM part is adjusted by altering the amount of resin material used in conjunction with the amount of blowing agent added to the resin system as it is injected into the mold. As an example, polyurethane resin systems can be reaction injection molded to produce pans having a density of anywhere from 2 to over 65 lbs. per cubic foot. Polyurethane resin systems using little or no blowing agent, thus producing a dense part of 50 lbs. per cubic inch or more, are commonly referred to as "high density parts," while resin systems containing more blowing agents and thus producing parts having a lower density of approximately 45 lbs. per cubic foot or less are commonly referred to as "low density parts."

The application of RIM systems was generally limited to forming parts having fairly low structural load requirements until the creation of "structural reaction injection molding" (SRIM). In SKIM systems, a structural reinforcement is placed within the mold cavity prior to injecting the resin system. Often, the structural reinforcement used is a woven or nonwoven mat, cloth, veil or roving. Such reinforcements can be formed of fiberglass, kevlar, graphite, or other reinforcing fibers. As the resin system is injected, it flows around and impregnates the fibrous reinforcement, forcing air out of the reinforcement and mold to produce a composite structural part. SRIM results in pans having an increased stiffness, toughness and strength relative to standard RIM pans.

All thermosetting injection molding systems including RIM and SRIM and RTM systems can be used to make pans of differing complexity. Often thermoset injection molded pans include ribs, stiffeners, beads, or other complex structural details. One recurring problem with all injection molding methods when used to form complex pans is areas of porosity or voids. When the resin fails to force all the air out of the mold and any reinforcements contained within the mold, air pockets are trapped within the part. These air pockets create voids or areas of porosity on the surface of or within the formed part. Voids and areas of porosity not only detract from the parts' aesthetics, but also reduce the structural integrity of the part depending upon the location and size of the void.

Voids or areas of porosity are especially prevalent in SRIM pans due to the increased resin flow restriction caused by the fibrous reinforcements within the part.

The reinforcements used in SRIM are generally fairly dense and of a woven or continuous strand glass mat nature, thus they impede the flow of the resin when it contacts and flows through the reinforcements during molding. The greater the percentage volume of reinforcements used, the harder it is for the resin to flow through the reinforcements, thus the greater the occurrence of voids or areas of porosity.

Depending upon the location and type of fibrous reinforcements, the resin can be channeled around the reinforcement as the resin follows a path of least resistance, thus increasing the occurrence of voids. In addition to the fibrous reinforcements, structural shapes such as ribs, channels, and beads often create paths of reduced resistance through which the resin flows, often resulting in air being trapped within the molded part. Because of the increased occurrence of voids in complex parts having fibrous reinforcements, ribs, channels and beads, complex shapes have not generally been formed using SRIM.

To reduce the formation of voids in all methods of thermoset injection molding, vents are strategically placed to exhaust air from the mold as it fills with resin. In simple symmetrical flat parts, the mold is generally filled with resin through an injection port in the center of the part. The resin then flows concentrically outwardly, forcing the air out vents located at the parting line in between the upper and lower portions of the mold. In simple flat parts, the resin flow pattern can be easily predicted and, thus, the vents can be located to ensure that no air is trapped in the part. In more complex parts, the resin is often injected into the mold at a location other than the geometric center. Off-center injection ports are generally used in parts that are not symmetrical or have shapes such as ribs, channels, or beads that tend to cause an uneven flow of resin. The more complex the part's shape, the more complex the resin flow pattern. Adding internal fibrous reinforcements such as those used in SRIM parts makes the resin flow pattern even more uneven.

If the resin flow pattern is known, the vents may be placed at strategic locations within the mold in an attempt to allow air to escape the mold as it is filled with resin, thus reducing the formation of voids. However, in complex parts, especially those containing internal fibrous reinforcements, it is impossible to accurately predict the resin flow pattern. In addition, the resin flow pattern may differ during successive molding cycles even if the interior shape of the mold and the molding parameters such as temperature, flow rate, etc., remain constant. As the resin flow pattern changes, so does the location of voids within the port. Thus, it is difficult if not impossible to locate the vents at locations to consistently eliminate all voids and areas of porosity in a complex part.

One way to reduce the number of voids in an injection molded part is to vent large amounts of resin through the vents. As the resin flows out of the vents, it carries some of the air trapped within the mold out. However, venting resin out the vents is extremely wasteful, adds significantly to the cost of the molded part, and generally does not eliminate all voids in a complex part.

An improved method of venting air from the mold during forming would allow more complex parts to be fabricated having a reduced number of voids. An improved method of venting air within the mold would also allow higher quality parts to be formed without excessive venting and waste of the resin, thus decreasing part costs. One goal of the present invention is to reduce some of the disadvantages of prior art thermosetting injection molding methods discussed above.

SUMMARY OF THE INVENTION

The present invention is a method and apparatus for venting air from a thermoset injection mold in order to reduce the number of voids and areas of porosity in an injection molded part. Vents are located near areas of the molded part that are prone to the formation of voids. The flow pattern of the injected resin is regulated around the periphery of the vents to slow the flow of the resin and allow air trapped within the mold to escape prior to the resin entering and blocking the vents. By allowing air to exit the mold prior to the resin blocking the vents, the present invention reduces or eliminates the formation of voids or porosity and also reduces waste by limiting the amount of excess resin that flows out of the mold.

The present invention regulates the flow of the resin around the periphery of the vents through the use of a porous flow regulator placed adjacent the vents along with porous plugs placed at least partially into the vents. The porous flow regulators control the flow of the resin around the vents to allow air trapped within the mold time to escape. Generally, resin injected into the mold will flow unevenly toward the vents; thus resin will reach the periphery of the vents from different directions at different times. This uneven resin flow often blocks the vents before all the air adjacent the vents can escape, thus creating air pockets, voids or areas of porosity in the completed part. The present invention's use of flow regulators slows down the portion of the resin flow closest the vents and allows time for the rest of the air preceding alternate flow fronts from other directions to escape prior to the vent getting plugged with resin. Regulating the flow of the resin around the vents allows the air around the vents to escape, thus reducing voids in the molded part.

In addition to a porous flow regulator, porous plugs extending at least partially through the porous flow regulators and into the vents are used. The porous plugs allow air to exit the vents, but prevents the resin from being vented through the vents.

In one method of reaction injection molding according to the present invention, a mold having an interior cavity that defines the shape of the molded part is provided. The mold includes one or more vents that allow air to escape during injection molding. A porous flow regulator is placed adjacent at least one of the vents to regulate the flow of the resin during forming.

In accordance with other aspects of the present invention, a porous sintered plug is placed at least partially within a vent. The porous plug may be formed from a sintered polyethylene, polypropylene, nonferrous or ferrous metal, ceramic, etc., or other suitable materials. The flow regulators may be formed of a woven or nonwoven polyester batting, a woven or nonwoven fiberglass mat, or other suitable materials. The flow regulators may be of various shapes and sizes, including rectangular, oval or round.

The present invention reduces the occurrence of voids in a number of different thermoset methods of injection molding, including RIM, SKIM, and RTM. The present invention is particularly advantageous in SKIM and RTM because of increased formation of voids caused by the addition of a structural reinforcement.

BRIEF DESCRIPTION OF THE DRAWINGS

The foregoing aspects and many of the attendant advantages of the invention will be better appreciated as the invention is better understood by reference to the following detailed description and accompanying drawings, wherein.

DETAILED DESCRIPTION OF THE PREFERRED EMBODIMENT

Figure 1:
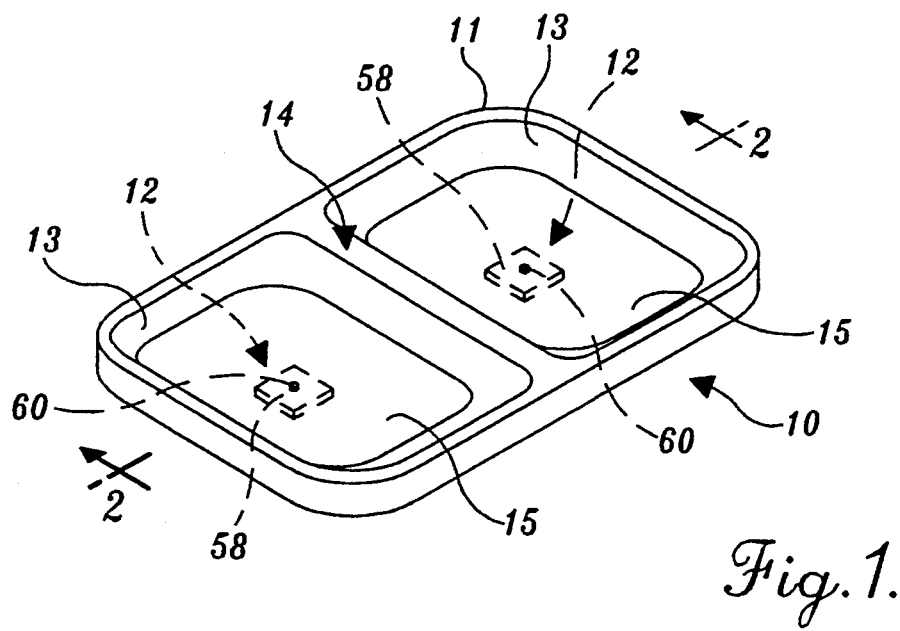
FIG. 1 is a perspective view of an exemplary part formed using a preferred embodiment of the present invention.
Figure 2:
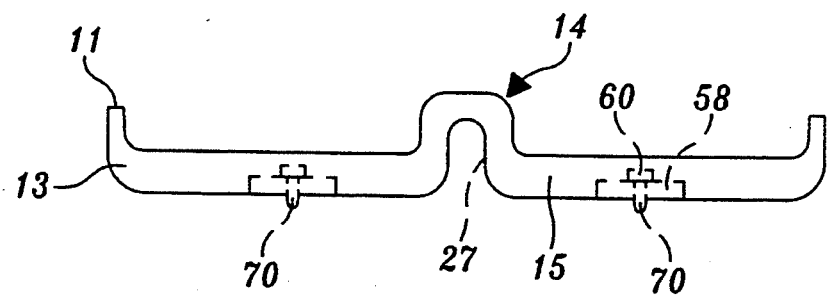
FIG. 2 is a cross section of the part of FIG. 1 along section line 2—2.

A preferred embodiment of a reaction injection molding process and apparatus in accordance with the present invention will now be described with reference to FIGS. 1–6. Referring to FIGS. 1 and 2, an exemplary part 10 has been formed by the reaction injection molding process of the present invention. The part 10 includes an upper peripheral edge 11 that extends around the top of the part and a dividing wall 14 that extends across the width of the center of the part. The part 10 also includes two recessed rectangular cavities 12. Each rectangular cavity extends downwardly from the peripheral edge 11 and is defined by downwardly and inwardly sloped walls 13 and a bottom 15. The two rectangular cavities 12 are separated from each other by the dividing wall 14. Integrally formed within the center of the bottom 15 of each cavity is a porous flow regulator 58 and a porous plug 60 as described in greater detail below.

The part 10 may be formed of any resin system suitable for thermoset injection molding including epoxy, polyurethane, polyester, dicyclopentadiene (DCPD), phenolic, vinyl ester, or other thermosetting resin systems. In addition, the part 10 may be formed using RIM, SRIM, RTM or other thermosetting injection molding system. The configuration of the part 10 is used for illustrative purposes to describe the present invention. However, the present invention may be used to form parts of all different shapes and sizes.

Figure 3:
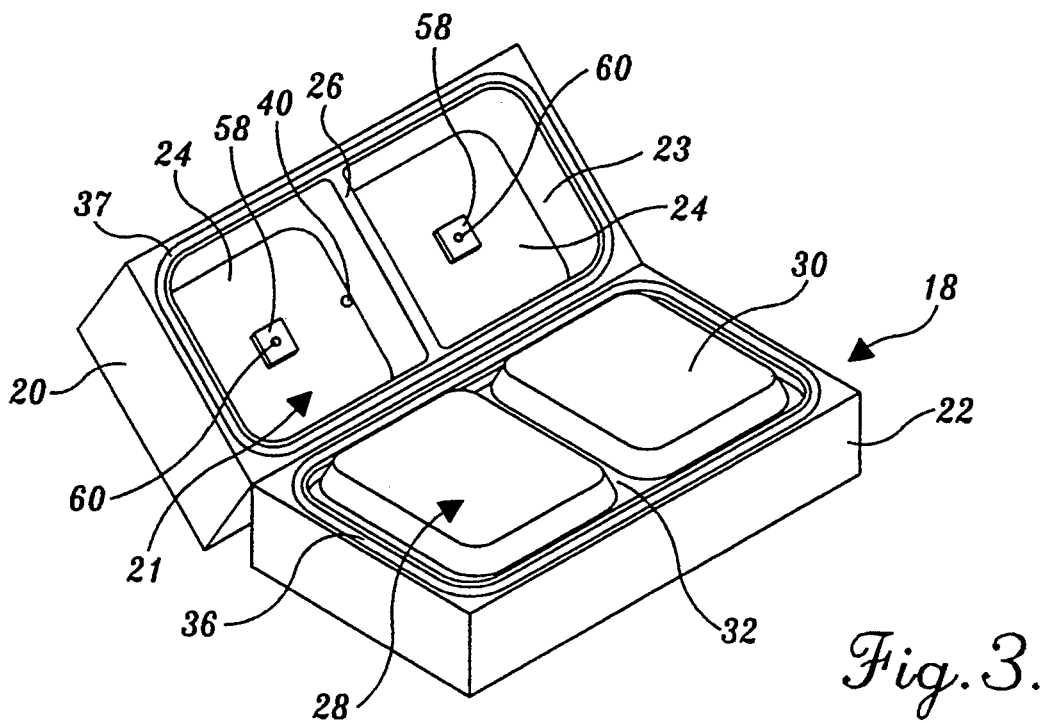
FIG. 3 is a perspective view of an injection mold used to produce the exemplary part of FIG. 1.
Figure 4:
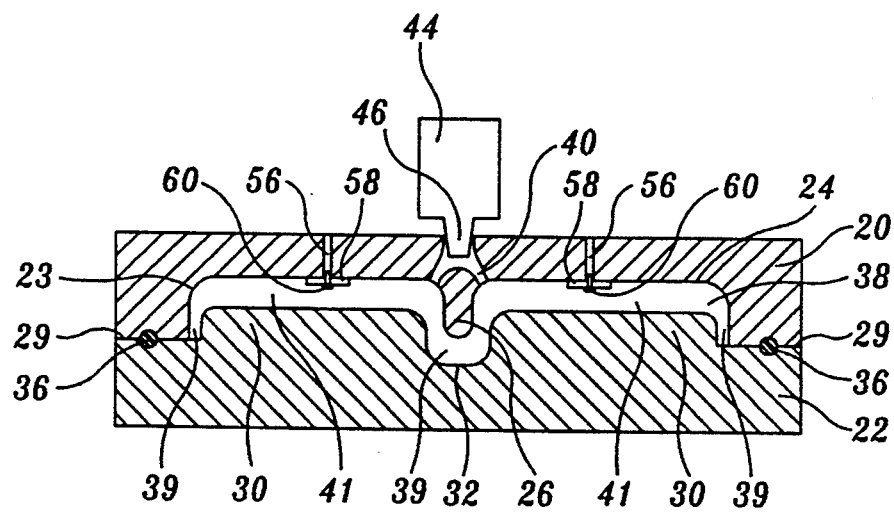
FIG. 4 is a cross-sectional view of the mold of FIG. 2 ready for injection molding to begin.

Referring now to FIGS. 3 and 4, a mold 18 is configured to form the part 10 in an inverted position so that gravity assists the resin to flow throughout the mold during resin injection. The mold 18 includes an upper tool 20 and lower tool 22 that are configured to cooperate and form a cavity defining the shape of the molded part. In FIG. 2, the mold 18 is illustrated in an open position to show the interior details of the mold, while FIG. 3 illustrates a cross section of the mold in a closed position in order to show how the upper 20 and lower 22 tools cooperate.

The upper tool 20 includes a recessed upper forming surface 21 having two rectangular cavities that define the bottom surface of the part 10 after molding. The upper forming surface 21 includes inwardly slanted walls 23 that define the exterior of the peripheral edge 11 and sloped walls 13 of the molded part. The walls 23 slope into the upper tool and toward the center of the tool to intersect a flat recessed surface 24 that defines the bottom 15 of the molded part 10. The upper forming surface 21 also includes an outwardly sloping wall 26 that extends outwardly from the recessed surface 24 across the width of the upper tool. The wall 26 defines the bottom surface 27 (FIG. 2) of the dividing wall 14 in the molded part 10.

The lower tool 22 includes a lower forming surface 28 that cooperates with the recessed upper forming surface 21 to form a cavity 38 that defines the shape of the molded part 10 when the mold 18 is closed as illustrated in FIG. 4. The lower forming surface 21 includes two rectangular protrusions 30 having walls that slope upwardly and inwardly approximately parallel to the recessed upper forming surface 21 when the mold is closed. The lower forming surface 28 also includes a recessed channel portion 32 that slopes downwardly between the two rectangular protrusions across the width of the upper forming surface approximately parallel to the wall 26 when the mold is closed (FIG. 3).

During forming, the upper and lower tools 20 and 22 are brought together along a parting line 29, as shown in FIG. 4, to form the enclosed cavity 38. In some applications, it is advantageous to place an O-ring or other type of seal 36 and corresponding channel 37 around the periphery of the lower and upper tools, respectively, in order to seal the parting line 29.

As illustrated in FIG. 4, the upper tool 20 includes a main injection port 40 through which a resin system is injected into the cavity 38. The main injection port 40 is located in the approximate geometric center of the cavity 38. The main injection port 40 splits into two separate injection ports, one extending into the cavity 38 on either side of the dividing wall 26.

Any suitable resin system may be injected into the cavity 38 through the injection port 40 directly or indirectly from a high or low pressure static or dynamic mixing head 44. Any thermosetting injection system such as RIM, SRIM, or RTM systems could be used. The configuration of the injection fitting 44 will differ depending on the type of injection system used and is readily determined by one of ordinary skill in the art.

As resin is injected into the cavity 38, it flows along the wall 26 and then flows outwardly toward the edges of the cavity until the cavity is completely filled. In order to allow air to exit the interior of the cavity 38, vents (not shown) may be located along the periphery of the parting line 29 between the upper and lower tools. As the resin flows toward the edges of the cavity, the resin forces the air within the cavity 38 out through the vents at the parting line 29.

Although placing vents along the parting line 29 allows most of the air within the cavity to be forced out during molding, air may still be trapped within the formed part. For example, in the exemplary part 10, one area that may be prone to voids caused by trapped air is the center of the bottom 15 of each rectangular cavity. The part 10 may be even more prone to have voids if a fibrous reinforcement is placed within the interior of the cavity 38 along the recessed surface 24 (FIG. 4). In FIG. 3, no internal reinforcement is shown within the cavity 38. However, any suitable fibrous reinforcements such as a woven cloth, mat, or similar material formed of fiberglass, graphite, kevlar or other fibers could be placed within the cavity 38 prior to injecting the resin through injection port 40.

When a fibrous reinforcement is placed within the cavity 38, the resin may tend to flow through the channels 39 formed between the upper and lower tools as opposed to flowing through the portion 41 of the cavity that defines the bottom of the part 10. The fibrous reinforcement tends to impede the flow of the resin, thus causing the resin to take the path of least resistance such as the channels 39, where a reinforcement is not present.

In accordance with the present invention, to help all the air escape from the mold, it is advantageous to place vents 56 in the upper tool. The vents should be located in areas where the molded part 10 is prone to have voids or areas of porosity. Areas prone to the formation of voids may be determined through the skill of one of ordinary skill in the art or through trial and error by molding a part and observing where voids tend to form.

To reduce the formation of voids in the completed part, it is also advantageous to use flow regulators 58 to control the flow of the resin around the vents 56. The flow regulators 58 allow the air trapped within the cavity 38 to escape prior to allowing the resin to plug or block the vents 56. In the preferred embodiment, the flow regulators are formed of square pieces of a nonwoven, polyester batting, however, other materials and shapes can also be used. Other materials from which the flow regulators may be formed include woven, nonwoven or spunbond polyester mats, woven or nonwoven continuous strand or mat fiberglass, or other synthetic or natural fibrous or porous material.

The flow regulators should be formed of a material that is porous enough to allow the resin to penetrate the flow regulators, otherwise the flow regulators may cause voids in the completed part. However, the flow regulators must be dense enough to inhibit the flow of the resin so that air around the vents 56 is given time to escape prior to the resin flowing through the flow regulators and into the vents.

It may be advantageous to form the flow regulators in a square or rectangular shape in order to minimize waste of the material from which the flow regulators are formed. However, in some embodiments, it may be advantageous to make the flow regulators round, oval, or other shapes, as described in more detail below. The most advantageous loft (thickness) and density of the flow regulators will differ, depending on the type of reinforcement and resin system being used. Thus, in each application different materials should be experimented with to determine the best material from which to form the flow regulators.

Figure 5:
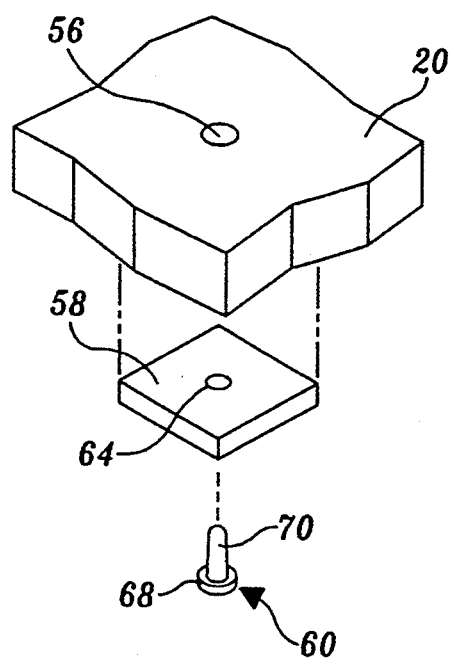
FIG. 5 is an exploded view of a portion of the mold of FIG. 2 illustrating the porous flow regulator and porous plug.

In the preferred embodiment, each flow regulator 58 includes a centrally located hole 64 through which a porous plug 60 may be inserted (FIG. 5). Each porous plug 60 includes a shoulder portion 68 that extends radially out from a cylindrical nipple 70. The porous plug 60 is placed within the hole 64 in the flow regulator such that the nipple 70 extends through the flow regulator and at least partially into the vent 56. When inserted into the hole 64, the shoulder 68 contacts the surface of the flow regulator 58 and prevents the porous plug from being pushed through the flow regulator. In addition to preventing the porous plug 60 from being pushed through the flow regulator, the combination of the shoulder 68 and nipple 70 help to maintain the flow regulator 58 in the proper position around the outlet port 56 during molding.

The porous plugs 60 should be formed of a material that is porous enough to allow the air trapped within the mold to easily escape through the vents 56. If the porous plugs 60 do not allow the air trapped within the mold to easily escape, it can place a back pressure on the flow of the resin and possibly cause an increased occurrence of voids or areas of porosity in the part. However, the porous plugs should also be dense enough to prevent excessive quantities of resin from flowing through the porous plugs and out through the outlet ports. If a porous plug 60 or similar regulator is not used, the internal pressure of the resin in most thermoset injection molding systems will cause large quantities of resin to be vented through the vents, regardless of the size of the vent holes 56.

The porous plugs 60 may be formed of a number of porous materials, including various ceramics, plastics, or metals. In the preferred embodiment, the porous plug is formed from a sintered polyethylene. The shape and size of the porous plug may change to allow for variations in resin viscosity, rate of rise of the resin system in RIM systems, and internal mold pressures.

In the preferred embodiment of the present invention, for a given application, the flow regulators are formed of a nonwoven polyester batting having a density of 1½ oz. per square foot and a loft of 3/16"-¼", and are 2" by 2". The porous plugs are formed of a sintered polyethylene having a pore size of 10 to 60 microns, a diameter of 5/32" in the nipple and a diameter of ¼" in the shoulder. The material properties described are for illustrative purposes only and could differ, depending upon the type of reaction injection molding, type of resin, and part configuration.

Figure 6:
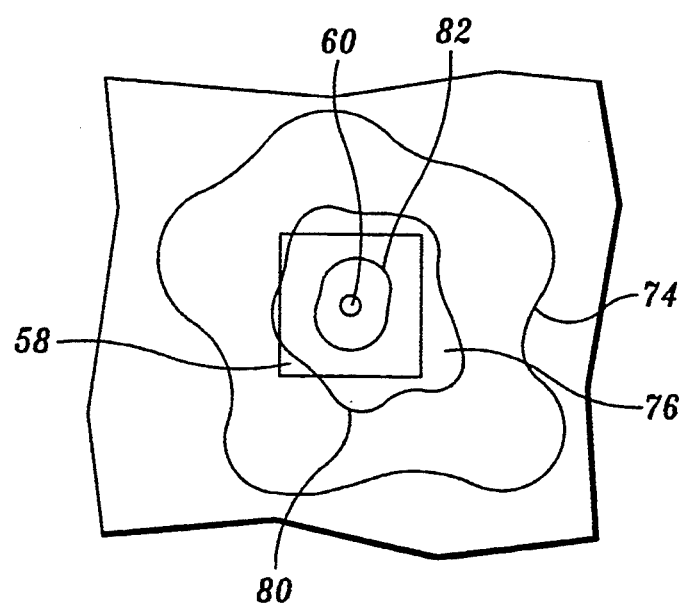
FIG. 6 is a representation of the resin flow around the vent in the mold of FIG. 2 during injection molding.

FIG. 6 illustrates an exemplary flow of the resin 74 toward the flow regulator 58, porous plug 60, and vent 56 at three progressive time intervals shown by flow boundaries 78, 80, and 82. Each flow boundary 78, 80, and 82 illustrates the edge of the resin flow at different intervals in time as the resin flows toward the vent 56. As shown by boundary 78, the resin tends to flow unevenly toward the vent 56. As shown by boundary 80, the resin 74 contacts the flow regulator 58 around part of the periphery of the flow regulator while air 76 is still trapped between the resin 74 and the flow regulator around other portions of the flow regulator. The flow regulator 58 is more dense than the trapped air, thus the flow regulator impedes the flow of the resin as it nears the vent 56. The flow regulator 58 acts to even out the flow of the resin as illustrated by boundary 82, around the vent 56 by impeding the movement of the fastest flowing portions of the resin near the vent. Thus, the flow regulator 58 produces a more uniform resin flow near the vent 56 and allows air 76 trapped around the vent to escape through the porous plug 60 before the vent is blocked by resin entering the porous plug.

During the forming operation, the resin penetrates and permeates the flow regulators 58 until it reaches and contacts the porous plugs 60. As the resin cures, it forms the flow regulators 58 and porous plugs 60 integrally into the molded part 60 as illustrated in FIGS. 1 and 2. As best seen in FIG. 2, the tip of the nipple 70 protrudes from the bottom 15 of the pan after forming. The nipple 70 of the porous plug may be trimmed flush with the bottom surface of the pan after forming if a smooth surface is desired.

In alternate embodiments, it may be advantageous to tailor the shape of the flow regulators 58 in order to better regulate the flow of the resin within an individual application. As an example, if the resin tends to flow toward the vent much faster on one side of the flow regulator than on another, the flow regulator 58 could be sized such that it extends outwardly from the vent further on the side of the faster approaching resin. Other possible shapes that may be useful in individual applications are ovals or circles.

The present invention helps to reduce or eliminate voids and areas of porosity in all types of thermoset injection molded parts. In manufacturing tests on one application, the present invention reduced part rejection rates due to voids and areas of porosity from 36% to below 1%. This reduction in part rejection rate in turn reduced overall pan fabrication costs. In addition to reducing part rejection rates, the present invention allows complex thermoset injection molded pans to be formed that were not possible in the past due to the occurrence of voids or areas of porosity. The present invention is especially applicable to SRIM and RTM systems due to the increased susceptibility of reinforced pans to voids caused by the fibrous reinforcements within the parts.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of injection molding a part comprising the steps of:
   (a) providing a mold having an interior cavity defining a shape of the part, the mold having an inlet through which resin is injected into the mold and a vent that extends through a surface of the interior cavity to allow air to exit the interior cavity of the mold;
   (b) placing a porous flow regulator in the interior cavity so that the flow regulator abuts the surface of the interior cavity adjacent and surrounding the vent and is spaced a distance away from the inlet;
   (c) injecting a resin into the mold through the inlet, the porous flow regulator regulating the flow of resin adjacent the vent as the resin flows toward the vent to allow air within the interior cavity to escape through the vent before the resin flows into the vent to reduce the formation of voids in the molded part.

2. The method of claim 1, further comprising the step of placing a porous plug in the porous flow regulator such that the porous plug extends at least partially into the vent and maintains the porous flow regulator adjacent the vent.

3. The method of claim 2, wherein the step of placing a porous plug further comprises placing a porous plug formed from a sintered polyethylene in the porous flow regulator.

4. The method of claim 1, wherein step (b) further comprises placing a porous flow regulator formed of at least one of a nonwoven polyester batting, a nonwoven fiberglass batting, a continuous strand polyester mat, and a continuous strand fiberglass mat adjacent the vent.

5. The method of claim 1, further comprising the step of locating the vent near a portion of the molded part that is prone to the occurrence of voids.

6. The method of claim 1, further comprising the step of placing a structural reinforcing material into the mold prior to the injecting step.

7. The method of claim 1, wherein step (b) further comprises placing a rectangular porous flow regulator adjacent the vent.

8. A method of regulating the flow of resin during the molding of an injection molded part to reduce the occurrence of voids in the molded part, the method comprising the steps of:
   (a) determining locations in the molded part that are prone to the occurrence of voids;
   (b) locating a vent in a mold, used to form the molded part, near the locations prone to voids, the mold including an inlet through which resin is injected into the mold;
   (c) placing a structural reinforcing material into the mold;
   (d) placing a porous flow regulator discrete from the structural reinforcing material in the mold abutting the surface of the mold adjacent the vent and surrounding the vent and spaced a distance away from the inlet;
   (e) injecting resin into the mold through the inlet so that the flow regulator regulates the flow of resin as the flow of resin nears the vent to allow air within the mold to escape through the vent before the resin flows into the vent to reduce the formation of voids in the molded part.

9. The method of claim 8, further comprising the step of placing a porous plug in the porous flow regulator so that it extends at least partially into the vent and helps to maintain the porous flow regulator adjacent the vent.

10. The method of claim 8, wherein step (c) further comprises placing a porous flow regulator formed of at least one of a nonwoven polyester batting, a nonwoven fiberglass batting, a continuous strand polyester mat, and a continuous strand fiberglass mat adjacent the vent.

11. The method of claim 8, wherein step (c) further comprises placing a rectangle porous flow regulator adjacent the vent.

12. A method of injection molding a part comprising the steps of:
   (a) providing a mold having an interior cavity defining a shape of the part, the mold having a vent that extends through a surface of the interior cavity to allow air to exit the interior cavity of the mold;
   (b) placing a porous flow regulator in the interior cavity so that the flow regulator abuts the surface of the interior cavity adjacent and surrounding the vent;
   (c) placing a porous plug in the porous flow regulator such that the porous plug extends at least partially into the vent and maintains the porous flow regulator adjacent the vent; and
   (d) injecting a resin into the mold, the porous flow regulator regulating the flow of the resin as it flows toward the vent to reduce the formation of voids in the molded part.

13. A method for regulating the flow of resin during the molding of an injection molded part to reduce the occurrence of voids in the molded part, a method comprising the steps of:
   (a) determining locations in the molded part that are prone to the occurrence of voids;
   (b) locating a vent in the mold, used to form the molded part, near the locations prone to voids;

(c) placing a porous flow regulator in the mold abutting the surface of the mold adjacent the vent and surrounding the vent;
(d) placing a porous plug in the porous flow regulator so that it extends at least partially into the vent and helps to maintain the porous flow regulator adjacent the vent; and
(e) injecting resin into the mold so that the flow regulator regulates the flow of resin as it nears the vent to allow air within the mold to escape to reduce the formation of voids in the molded part.

14. An apparatus for forming an injection molded part having reduced voids, the apparatus comprising:
(a) a mold having a cavity including an interior forming surface that defines the shape of the molded part, the mold including at least one inlet through which resin is injected into the mold and at least one vent located near areas of the molded part that are prone to the occurrence of voids;
(b) a porous flow regulator located in the cavity abutting the forming surface surrounding the area adjacent to vent and spaced a distance from the inlet to regulate a flow of resin injected into the mold through the inlet, as the flow of resin nears the vent and flows toward the vent, to allow air within the cavity to escape before the resin flows into the vent, thereby reducing voids in the injection molded part.

15. The apparatus of claim 14, further comprising a porous plug extending at least partially through the porous flow regulator and into the vent to help to maintain the porous flow regulator in position.

16. The apparatus of claim 15, wherein the porous plug is formed from at least one of a sintered polyethylene, a polypropylene, a ferrous metal, a nonferrous metal, and a ceramic.

17. The apparatus of claim 14, wherein the flow regulator is formed of at least one of a nonwoven polyester batting, a nonwoven fiberglass batting, a continuous strand polyester mat and a continuous strand fiberglass mat.

18. The apparatus of claim 14, wherein the porous flow regulator is in the shape of at least one of a square, a circle, or an oval.

19. A tool for use in injection molding a part, the tool comprising:
a mold having an interior cavity at least partially defining the shape of an injection molded part; the mold including at least one inlet through which resin is injected into the mold and at least one vent, located near portions of the molded part prone to the formation of voids, to allow air to escape from the cavity when a resin is injected into the cavity;
a structural reinforcing material located in the cavity to reinforce the formed part; and
a flow regulator located in the cavity abutting a surface of the mold adjacent and surrounding the vent and spaced a distance away from the inlet to regulate the flow of resin as it nears the vent to allow air to escape through the vent before the resin flows into the vent so as to reduce the formation of voids in the molded part, the flow regulator including a porous material located adjacent the vent and a porous plug extending at least partially into the vent.

20. The tool of claim 19, wherein the porous material is formed of at least one of a nonwoven polyester batting, a nonwoven fiberglass batting, a continuous strand polyester mat and a continuous strand fiberglass mat.

21. The tool of claim 19, wherein the porous plug is formed of at least one of a sintered polyethylene, a polypropylene, a ferrous metal, a nonferrous metal, and a ceramic.

22. An apparatus for forming an injection molded part having reduced voids, the apparatus comprising:
(a) a mold having a cavity including an interior forming surface that defines the shape of the molded part, the mold including at least one vent located near areas of the molded part that are prone to the occurrence of voids;
(b) a porous flow regulator located in the cavity abutting the forming surface and surrounding the vent to regulate a flow of resin injected into the mold, as the resin flows toward the vent, to allow air within the cavity to escape, thereby reducing voids in the injection molded part;
(c) a porous plug extending at least partially through the porous flow regulator and into the vent to help to maintain the porous flow regulator in position.

* * * * *

UNITED STATES PATENT AND TRADEMARK OFFICE
CERTIFICATE OF CORRECTION

Page 1 of 2

PATENT NO. : 5,443,778
DATED : August 22, 1995
INVENTOR(S) : R.M. Schlingman

It is certified that error appears in the above-indentified patent and that said Letters Patent is hereby corrected as shown below:

| COLUMN | LINE | |
|---|---|---|
| [54] col. 1 | Title | "MOULDING" should read --MOLDING-- |
| col. 2 | Primary Examiner | "Jill J. Heitbrink" should read --Jill L. Heitbrink-- |
| 1 | 2 & 3 | "MOULDING" should read --MOLDING-- |
| 2 | 26 | "pans" should read --parts-- |
| 2 | 39 | "SKIM systems" should read --SRIM systems-- |
| 2 | 48 | "pans" should read --parts-- |
| 2 | 50 | "pans" should read --parts-- |
| 2 | 53 | "pans" should read --parts-- |
| 2 | 54 | "pans" should read --parts-- |
| 2 | 57 | "pans" should read --parts-- |
| 2 | 67 | "pans" should read --parts-- |
| 4 | 66 | "SKIM" should read --SRIM-- |

UNITED STATES PATENT AND TRADEMARK OFFICE
CERTIFICATE OF CORRECTION

PATENT NO. : 5,443,778
DATED : August 22, 1995
INVENTOR(S) : R.M. Schlingman

It is certified that error appears in the above-indentified patent and that said Letters Patent is hereby corrected as shown below:

| COLUMN | LINE | |
|--------|------|---|
| 4 | 68 | "SKIM" should read --SRIM-- |
| 8 | 62 | "pan" should read --part-- |
| 8 | 64 | "pan" should read --part-- |
| 9 | 14 | "pan" should read --part-- |
| 9 | 16 | "pans" should read --parts-- |
| 9 | 21 | "pans" should read --parts-- |

Signed and Sealed this

Thirtieth Day of January, 1996

Attest:

BRUCE LEHMAN

Attesting Officer        Commissioner of Patents and Trademarks